(12) United States Patent
Hwang et al.

(10) Patent No.: US 11,528,056 B2
(45) Date of Patent: Dec. 13, 2022

(54) MOBILE TERMINAL AND CONTROL METHOD THEREFOR

(71) Applicant: LG ELECTRONICS INC., Seoul (KR)

(72) Inventors: Jeonghwan Hwang, Seoul (KR); Chanhong Park, Seoul (KR); Hyunjoon Lee, Seoul (KR); Youngil Kim, Seoul (KR); Hyunjung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/257,919

(22) PCT Filed: Dec. 13, 2018

(86) PCT No.: PCT/KR2018/015832
§ 371 (c)(1),
(2) Date: Jan. 5, 2021

(87) PCT Pub. No.: WO2020/017711
PCT Pub. Date: Jan. 23, 2020

(65) Prior Publication Data
US 2021/0281290 A1 Sep. 9, 2021

(30) Foreign Application Priority Data
Jul. 17, 2018 (KR) ........................ 10-2018-0083076

(51) Int. Cl.
*H04B 5/00* (2006.01)
*H04B 1/3888* (2015.01)
*H04M 1/724* (2021.01)

(52) U.S. Cl.
CPC ......... *H04B 5/0031* (2013.01); *H04B 1/3888* (2013.01); *H04M 1/724* (2021.01)

(58) Field of Classification Search
None
See application file for complete search history.

(56) References Cited

U.S. PATENT DOCUMENTS 8,463,186 B2 * 6/2013 Griffin .............. H04M 1/72412
455/41.2
8,744,537 B1 * 6/2014 Rao ..................... H04M 1/7246
455/575.1

(Continued)

FOREIGN PATENT DOCUMENTS

| KR | 1020100094077 | 8/2010 |
| KR | 1020150094231 | 8/2015 |

(Continued)

OTHER PUBLICATIONS

PCT International Application No. PCT/KR2018/015832, International Search Report dated Apr. 16, 2019, 11 pages.

*Primary Examiner* — Tuan A Tran
(74) *Attorney, Agent, or Firm* — Lee Hong Degerman Kang Waimey

(57) ABSTRACT

The present invention relates to a control circuit system of a pair of mobile terminals comprising a first mobile terminal and a second mobile terminal. The first mobile terminal comprises a first display unit, a first fastening unit, a proximity sensor for recognizing a connection with the second mobile terminal, and a first control circuit including a first near-field communication module and a first signal aggregator for transmitting/receiving a signal to and from the second mobile terminal. The second mobile terminal comprises a second display unit, a second fastening unit connected to the first fastening unit, and a second control circuit including a second near-field communication module and a second signal aggregator for transmitting/receiving a signal to and from the first mobile terminal. A signal transmitted from the first near-field communication module (Continued)

is received by the second near-field communication module and displayed on the second display unit.

8 Claims, 17 Drawing Sheets

(56) References Cited

U.S. PATENT DOCUMENTS

| | | | | |
|---|---|---|---|---|
| 9,134,762 | B2* | 9/2015 | Del Toro | H04W 4/80 |
| 9,538,676 | B2* | 1/2017 | Chen | G06F 1/16 |
| 9,559,743 | B2* | 1/2017 | Del Toro | G06F 1/1632 |
| 9,998,580 | B2* | 6/2018 | Brogan | G06F 1/1692 |
| 10,054,465 | B2* | 8/2018 | Fedtke | G01D 5/12 |
| 10,084,898 | B2* | 9/2018 | Del Toro | H04M 1/0266 |
| 10,333,576 | B2* | 6/2019 | Evans, V | G06F 1/1683 |
| 10,498,870 | B2* | 12/2019 | Del Toro | H04W 56/002 |
| 10,574,807 | B2* | 2/2020 | Penke | H04M 1/72409 |
| 10,908,923 | B2* | 2/2021 | Wang | G01C 21/20 |
| 10,917,510 | B1* | 2/2021 | Hong | G06F 1/1635 |
| 2004/0203381 | A1* | 10/2004 | Cahn | H04B 5/02 455/41.2 |
| 2018/0375541 | A1* | 12/2018 | Yoo | A45C 11/00 |

FOREIGN PATENT DOCUMENTS

| | | |
|---|---|---|
| KR | 101579887 | 12/2015 |
| KR | 1020170009001 | 1/2017 |
| KR | 1020180018049 | 2/2018 |

* cited by examiner

MOBILE TERMINAL AND CONTROL METHOD THEREFOR

CROSS-REFERENCE TO RELATED APPLICATIONS

This application is the National Stage filing under 35 U.S.C. 371 of International Application No. PCT/KR2018/015832, filed on Dec. 13, 2018, which claims the benefit of earlier filing date and right of priority to Korean Application No. 10-2018-0083076, filed on Jul. 17, 2018, the contents of which are all hereby incorporated by reference herein in their entirety.

TECHNICAL FIELD

The present disclosure relates to a pair of mobile terminals combinable with or separable from each other and a control method therefor.

BACKGROUND ART

Terminals including a display may be classified as mobile/portable terminals or stationary terminals according to mobility thereof. Mobile terminals may also be classified as handheld terminals or vehicle mounted terminals according to whether or not a user can directly carry the terminal.

As functions of such terminals are diversified, the terminals are implemented in the form of multimedia players equipped with composite functions such as photography or video capture, music or video file playback, and broadcast reception.

As the terminal is implemented in the form of the multimedia devices, users feel the need to use the terminal by adjusting the size of a screen as necessary. However, existing terminals provide only a display of a fixed size, so it is difficult to meet this need.

To support and increase the functions of the terminals, improvement of a structural part and/or software part of the terminals may be considered.

DETAILED DESCRIPTION OF THE DISCLOSURE

Technical Problems

An object of the present disclosure is to provide a control circuit system for a pair of mobile terminals capable of efficiently and stably transmitting data while providing a larger screen when the mobile terminals that are combinable with or separable from each other are connected.

Another object of the present disclosure is to support multitasking through a plurality of display units based on one system by displaying different images by respective display units of a pair of mobile terminals.

Another object of the present disclosure is to provide a pair of mobile terminals that is easy to carry and has a structure that stably connects the mobile terminals and protects the mobile terminals from external impact.

It will be appreciated by persons skilled in the art that the technical objects to be achieved through the present disclosure are not limited to what has been particularly described hereinabove and other technical objects not described herein will be more clearly understood from the following detailed description.

Technical Solutions

To achieve these objects and in accordance with an aspect of the present disclosure, a control circuit system for a pair of mobile terminals including a first mobile terminal and a second mobile terminal is provided. The first mobile terminal includes a first display unit, a first fastening unit, a proximity sensor configured to sense connection with the second mobile terminal, and a first control circuit including a first near field communication module and a first signal aggregator, configured to transmit and receive a signal to and from the second mobile terminal. The second mobile terminal includes a second display unit, a second fastening unit connected to the first fastening unit, and a second control circuit including a second near field communication module and a second signal aggregator, configured to transmit and receive a signal to and from the first mobile terminal. A signal transmitted by the first near field communication module is received by the second near field communication module and is then displayed on the second display unit.

The proximity sensor may sense whether the connection is made using magnetic force. The second mobile terminal may serve as a protective case of the first mobile terminal. The first and second near field communication modules may wirelessly transmit and receive a signal in a bandwidth of 60 GHz. The first and second near field communication modules may transmit and receive an image signal. The first and second signal aggregators may transmit and receive a communication control signal, and a touch information signal and a brightness control signal of the second display unit. The second fastening unit may receive power from the first fastening unit, and the first and second signal aggregators may transmit and receive a signal through the first and second fastening units. The first and second display units may display different images. The first and second fastening units may be configured as pogo pins.

To achieve these objects and in accordance with another aspect of the present disclosure, a second mobile terminal coupled to a first mobile terminal including a first display unit includes a fastening unit connected to the first mobile terminal, a circuit substrate unit including a near field communication module and a signal aggregator, a first cover including the fastening unit and the circuit substrate unit, a second cover including a second display unit, and a supporter configured to connect the first cover and the second cover. The near field communication module transmits and receives a signal to and from the first mobile terminal.

The fastening unit may receive power from the first mobile terminal and transmit and receive a signal. The near field communication module may wirelessly transmit and receive a signal to and from the first mobile terminal in a bandwidth of 60 GHz. The signal aggregator may transmit and receive a signal to and from the first mobile terminal through the fastening unit. The first cover may be configured to cover an outer appearance of the first mobile terminal except for the first display unit. The supporter may be formed of a flexible material to fold or unfold the first cover and the second cover. The second display unit may receive a signal from the first mobile terminal and display the signal, and the first display unit and the second display unit may display different images.

To achieve these objects and in accordance with another aspect of the present disclosure, a control circuit system for a pair of mobile terminals including a first mobile terminal having a first control circuit and a second mobile terminal having a second control circuit is provided. The first control circuit includes a first power supply unit, a first display unit, a first input unit, a first fastening unit, and first to third near field communication modules configured to transmit and receive data between the pair of mobile terminals. The second control circuit includes a second power supply unit, a second display unit, a second input unit, a second fastening unit configured to sense whether the first mobile terminal and the second mobile terminal are combined or separated, and fourth to sixth near field communication modules configured to transmit and receive data between the pair of mobile terminals, an image converter, and a system controller.

The first mobile terminal may serve as a main terminal, and the second mobile terminal may serve as a sub terminal and may be configured to receive an image from the main terminal and include only minimum elements for displaying the image. The second mobile terminal may be configured in a case form of the first mobile terminal. The first and second input units are touch sensors deposited on the first and second display units. The first and second fastening units may transmit and receive power or power and data when the pair of mobile terminals is connected. When power is transmitted and received through the first and second fastening units, the first and fourth near field communication modules may transmit and receive a digital image signal. The second and fifth near field communication modules may transmit and receive a communication control signal needed to transmit and receive the digital image signal. The image converter may convert the digital image signal received through the fourth near field communication module into a signal that is suitable for the second display unit to receive. The second and third near field communication modules may be replaced with signal aggregators, and the fifth and sixth near-field communication modules may also be replaced with signal aggregators. An input signal received through the first and second input units may be transmitted and received through the third and sixth near field communication modules.

Advantageous Effects

According to an embodiment of the present disclosure, a pair of mobile terminals and a control method therefor enable the mobile terminals to efficiently and stably transmit and receive data when the mobile terminals are coupled to each other.

According to another embodiment of the present disclosure, a pair of mobile terminals may support extended user experience and multitasking.

According to another embodiment of the present disclosure, a pair of mobile terminals may be easy to carry before the mobile terminals are coupled to each other and may protect the mobile terminals from external impact after the mobile terminals are coupled to each other.

It will be appreciated by persons skilled in the art that that the effects to be achieved through the present disclosure are not limited to what has been particularly described hereinabove and other advantages of the present disclosure will be more clearly understood from the following detailed description.

BEST MODE FOR CARRYING OUT THE DISCLOSURE

Hereinafter, a description of a pair of mobile terminals according to the present disclosure will be given in detail with reference to the accompanying drawings. A suffix such as "module" or "unit" is assigned or used only to facilitate description of the specification, and the suffix itself is not intended to have any special meaning or function.

Mobile terminals presented in the present disclosure may include cellular phones, smartphones, laptop computers, digital broadcast terminals, personal digital assistants (PDAs), portable multimedia players (PMPs), navigators, and the like.

Figure 1:
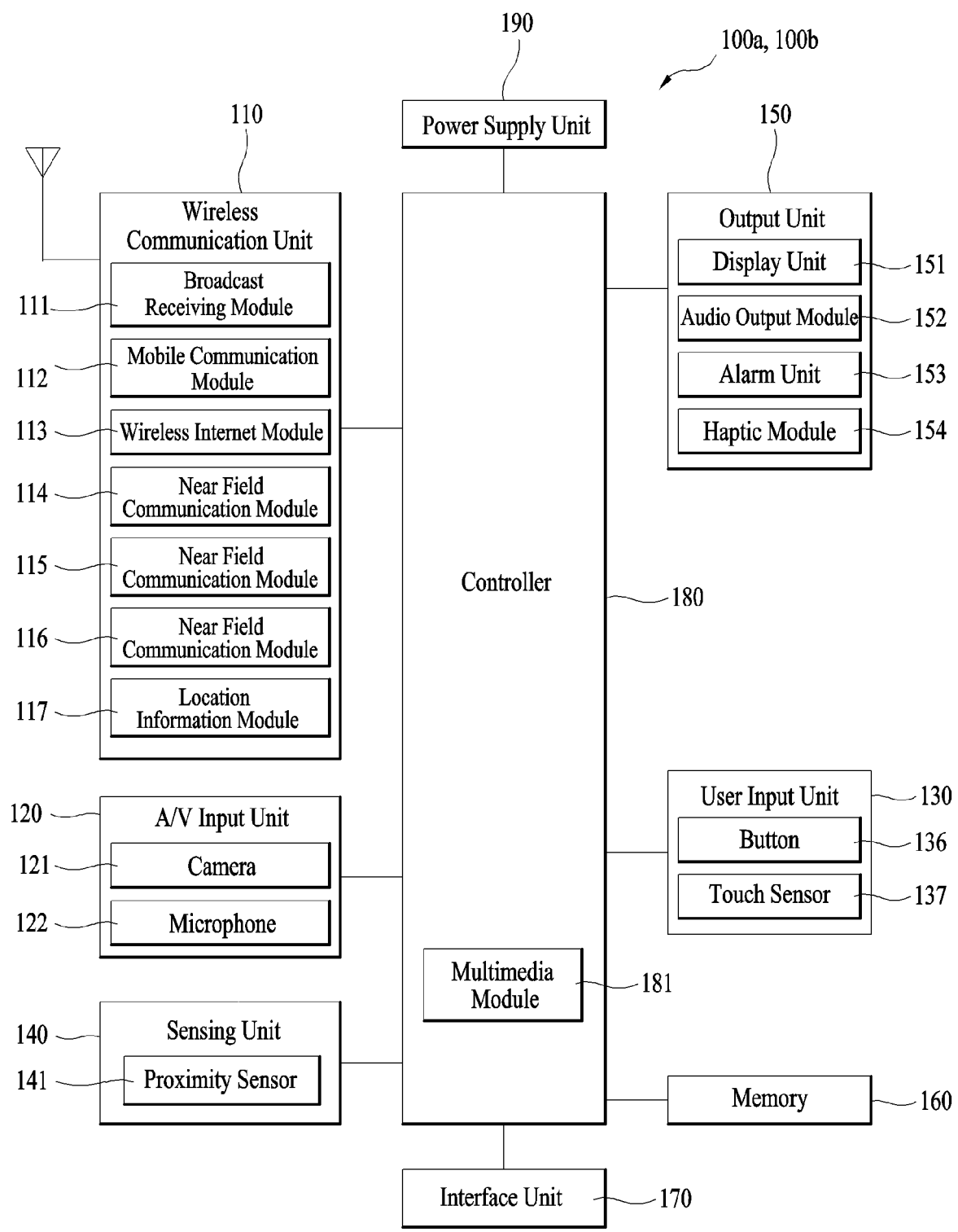
FIG. 1 is a diagram of one of a pair of mobile terminals according to an embodiment of the present disclosure.

FIG. 1 is a diagram of a pair of mobile terminals 100a and 100b according to an embodiment of the present disclosure. The diagram of FIG. 1 shows elements included in one mobile terminal. Each of a pair of mobile terminals 100a and 100b may include a part or all of the elements of the diagram of FIG. 1.

The mobile terminal 100a and/or 100b may include a wireless communication unit 110, an audio/video (A/V) input unit 120, a user input unit 130, a sensing unit 140, an output unit 150, a memory 160, an interface unit 170, a controller 180, and a power supply unit 190. The elements shown in FIG. 1 are not always indispensable and greater or fewer elements may be implemented as the mobile terminal 100a and/or 100b. The mobile terminal 100a may be referred to as a first mobile terminal and the mobile terminal 100b may be referred to as a second mobile terminal. In addition, the first mobile terminal may be, for example, a smartphone, and the second mobile terminal may be, for example, a case having communication and display functions. The controller 180 may be referred to as a control circuit or a circuit.

Hereinafter, the above elements will be sequentially described.

The wireless communication unit 110 includes one or more modules which enable wireless communication between the mobile terminal 100a and/or 100b and a wireless communication system or between the mobile terminal 100*a* and/or 100*b* and a network in which the mobile terminal 100*a* and/or 100*b* is located. For example, the wireless communication unit 110 may include a broadcast receiving module 111, a mobile communication module 112, a wireless Internet module 113, near field communication modules 114, 115, and 116, and a location information module 117.

The broadcast receiving module 111 receives a broadcast signal and/or broadcast associated information from an external broadcast managing server via a broadcast channel. The broadcast channel may include a satellite channel and a terrestrial channel. The mobile terminals 100*a* and 100*b* are provided with two or more broadcast receiving modules 111 to facilitate simultaneous reception of at least two broadcast channels or to support switching among broadcast channels.

The broadcast managing server may refer to a server which generates and transmits a broadcast signal and/or broadcast associated information or a server which receives a pre-generated broadcast signal and/or broadcast associated information and sends the same to the terminal. The broadcast signal may be any of a TV broadcast signal, a radio broadcast signal, a data broadcast signal, and a broadcast signal combining the data broadcast signal with the TV broadcast signal or the radio broadcast signal.

The broadcast associated information refers to information associated with a broadcast channel, a broadcast program, or a broadcast service provider. The broadcast associated information may also be provided via a mobile communication network. In this case, the broadcast associated information may be received by the mobile communication module 112.

The broadcast associated information may be implemented in various formats. For instance, the broadcast associated information may be implemented in formats such as an electronic program guide (EPG) of digital multimedia broadcasting (DMB), an electronic service guide (ESG) of digital video broadcast-handheld (DVB-H), and the like.

The broadcast receiving module 111 may receive a digital broadcast signal using digital broadcast systems, such as digital multimedia broadcasting-terrestrial (DMB-T), digital multimedia broadcasting-satellite (DMB-S), media forward link only (MediaFLO), DVB-H, DVB-convergence of broadcasting and mobile service (CBMS), open mobile alliance-broadcast (OMA-BCAST), China multimedia mobile broadcasting (CMMB), mobile broadcasting business management system (MBBMS), and integrated services digital broadcast-terrestrial (ISDB-T). The broadcast receiving module 111 may also be configured to be applied to other broadcast systems in addition to the above-described digital broadcast systems.

The broadcast signal and/or the broadcast associated information received via the broadcast receiving module 111 may be stored in the memory 160.

The mobile communication module 112 transmits and receives wireless signals to and from at least one of a base station, an external mobile terminal, or a server in a mobile communication network such as a global system for mobile communication (GSM), a code division multiple access (CDMA) system, or a wideband CDMA (WCDMA) system (but the mobile communication system is not limited thereto). The wireless signals may include audio call signals, video call signals, or various formats of data to support communication of text and multimedia messages.

The wireless Internet module 113 refers to a module for wireless Internet access. This module may be internally or externally coupled to the mobile terminal 100*a* and/or 100*b*. Examples of such wireless Internet access include wireless LAN (WLAN), Wi-Fi, wireless broadband (WiBro), worldwide interoperability for microwave access (WiMAX), high speed downlink packet access (HSDPA), high speed uplink packet access (HSUPA), GSM, CDMA, WCDMA, long term evolution (LTE) (wireless Internet access is not limited thereto).

Considering that wireless Internet access according to WiBro, HSDPA, GSM, CDMA, WCDMA, or LTE is implemented by a mobile communication network, the wireless Internet module 113 performing wireless Internet access using the mobile communication network may be understood as a type of the mobile communication module 112.

The near field communication modules 114, 115, and 116 refer to modules for near field communication. Technologies for implementing such near field communication may include Bluetooth, radio frequency identification (RFID), infrared data association (IrDA), ultra-wideband (UWB), and ZigBee.

Alternatively, the near field communication modules may use a frequency band of 60 GHz for near field communication using extremely high frequency (EHF). Then, the near field communication modules may have a simple structure while maintaining lower power, high speed, and security.

The location information module 117 refers to a module for acquiring the location of the mobile terminal. As an example, the location information module 117 includes a global positioning system (GPS) module. According to current technology, the GPS module 117 may acquire information about distances from three or more satellites and information about time and then apply trigonometry to the acquired information, thereby accurately obtaining information about a 3-dimensional current location based on latitude, longitude, and altitude. Currently, a method of acquiring information about a location and time using three satellites and correcting an error of the information about the location and time using another satellite is widely used. The GPS module 117 may acquire information about speed by continuously calculating a current location in real time.

Referring to FIG. 1, the A/V input unit 120 may be configured to input an audio signal or a video signal and include a camera 121 and a microphone 122. The camera 121 processes a video frame, such as a still image or a video image, obtained by an image sensor in a video call mode or a capture mode. The processed video frame may be displayed on a display unit 151.

The video frame processed by the camera 121 may be stored in the memory 160 or may be externally transmitted through the wireless communication unit 110. Two or more cameras 121 may be provided according to use environment.

The microphone 122 receives an external audio signal in a call mode, a recording mode, or a voice recognition mode and processes the audio signal into electric voice data. The processed voice data may be transformed into a format transmittable to a mobile communication base station through the mobile communication module 112 in the call mode. The microphone 122 may implement various noise cancellation algorithms to cancel noise generated in a process of receiving the external audio signal.

The user input unit 130 causes a user to generate input data for controlling operation of the terminal. The user input unit 130 may include a button 136 located on a front, rear, or side surface of the mobile terminal 100*a* and/or 100*b* and a touch sensor 137 (static pressure/capacitive sensor). Although not shown, the user input unit 130 may further include a keypad, a dome switch, a jog wheel, or a jog switch.

The sensing unit 140 senses a current state of the mobile terminal 100a and/or 100b, such as an opened or closed state of the mobile terminal 100a and/or 100b, the location of the mobile terminal 100a and/or 100b, contact or non-contact by a user, an azimuth of the mobile terminal, or acceleration/deceleration of the mobile terminal, and generates a sensing signal for controlling operation of the mobile terminal 100a and/or 100b. For example, when the mobile terminal 100a and/or 100b is a slide type phone, the sensing unit 140 may sense whether the slide type phone is opened or closed. The sensing unit 140 may further sense whether power is supplied by the power supply unit 190 or the interface unit 170 is coupled to an external device.

The output unit 150 is configured to generate video, audio, or tactile output. The output unit 150 may include a display unit 151, an audio output unit 152, an alarm unit 153, and a haptic module 154.

The display unit 151 is configured to display (output) information processed in the mobile terminal 100a and/or 100b. For example, when the mobile terminal is in a call mode, the display unit 151 may display a user interface (UI) or a graphical user interface (GUI) associated with a call. When the mobile terminal is in a video call mode or a capture mode, the display unit 151 displays a captured and/or received image, the UI, or the GUI.

The display unit 151 may include at least of a liquid crystal display (LCD), a thin film transistor-liquid crystal display (TFT-LCD), an organic light emitting diode (OLED), a flexible display, or a 3-dimensional (3D) display.

Thereamong, some display units may be implemented as a transparent type or an optical transmission type through which an outside thereof is visible. Such a display is referred to as a transparent display. A representative example of the transparent display includes a transparent OLED (TOLED). A rear structure of the display unit 151 may also be implemented as an optical transmission structure. By this structure, the user may view an object located at a rear side of a terminal body through an area occupied by the display unit 151 of the terminal body.

The display unit 151 may be implemented in two or more in number according to an implementation aspect of the mobile terminal 100a and/or 100b. For instance, plural display units 151 may be arranged on one surface to be separated from each other or to be integrated into one, or may be arranged on different surfaces.

When the display unit 151 has an interlayered structure or an integrated structure with the touch sensor 137 (hereinafter referred to as a touchscreen), the display unit 151 may also be used as an input device as well as an output device. For example, when the touch sensor 137 is implemented as a touch film, a touch sheet, or a touch pad, the touch sensor 137 may form a layered structure deposited on the display nit 151 or may have an integrated structure included in a configuration of the display unit 151.

The touch sensor 137 may be configured to convert a change in pressure applied to a specific portion of the display 151 or capacitance generated at a specific portion of the display unit 151 into an electric input signal. The touch sensor 137 may also be configured to sense not only a touched position and a touched area, but also touch pressure.

When touch input is sensed by the touch sensor 137, corresponding signals are transmitted to a touch controller (not shown). The touch controller may process the signals and then transmit corresponding data to the controller 180. Accordingly, the controller 180 may be aware of which region of the display unit 151 has been touched.

A proximity sensor 141 may be disposed in an inner region of the mobile terminal, surrounded by the touchscreen, or may be disposed in the vicinity of the touchscreen. The proximity sensor refers to a sensor to sense presence or absence of an object approaching a surface to be sensed, or an object located near a surface to be sensed, by using an electromagnetic field or infrared rays without mechanical contact. The proximity sensor has a longer lifespan and higher utilization than a contact sensor.

The proximity sensor 141 may include, for example, a transmissive type photoelectric sensor, a direct reflective photoelectric sensor, a mirror reflective photoelectric sensor, a high-frequency oscillation proximity sensor, a capacitive proximity sensor, a magnetic proximity sensor, an infrared proximity sensor, and the like. When the touchscreen is implemented as a capacitive type, the proximity sensor 141 may be configured to sense proximity of a pointer by changes of an electromagnetic field, which is responsive to an approach of the point. In this case, the touchscreen (touch sensor) may also be categorized as the proximity sensor.

Another example of the proximity sensor may be a Hall integrated circuit (IC) which may sense whether an object is near or far away using magnetic force.

For convenience of description, a behavior that a pointer is sensed to be positioned on the touchscreen without contact will be referred to as "proximity touch", whereas a behavior that the pointer substantially comes in contact with the touchscreen will be referred to as "contact touch". A position at which proximity touch is performed on the touchscreen by the pointer may indicate a position at which the pointer is perpendicular to the touch screen during proximity touch of the pointer.

The proximity sensor senses proximity touch, and proximity touch patterns (for example, proximity touch distance, direction, speed, time, position, moving status, and the like). Information corresponding to the sensed proximity touch operation and proximity touch pattern may be output on the touchscreen.

The audio output module 152 is configured to output audio data received from the wireless communication unit 110 or stored in the memory 160 in a call-receiving mode, a call-placing mode, a recording mode, a voice recognition mode, or a broadcast reception mode. The audio output module 152 may output audio signals related to functions (e.g., sound indicating that a call signal or a message is received) performed in the mobile terminal 100a and/or 100b. The audio output module 152 may include a receiver, a speaker, a buzzer, or the like.

The alarm unit 153 outputs a signal notifying occurrence of an event from the mobile terminal 100a and/or 100b. Examples of the event occurring from the mobile terminal 100a and/or 100b include call reception, message reception, key signal input, and touch input. The alarm unit 153 may output a signal to notify occurrence of the event in a vibration manner, in addition to a video signal or an audio signal. Since the video signal or audio signal may also be output through the display unit 151 or the audio output module 151, the display unit 151 of the audio output module 152 may be categorized as a part of the alarm unit 153.

A haptic module 154 generates various tactile effects that a user may feel. A representative example of the tactile effects generated by the haptic module 153 includes vibration. Vibration generated by the haptic module 154 has a controllable intensity and a controllable pattern. For example, the haptic module 154 may output different vibration in a synthesized manner or in a sequential manner.

In addition to vibration, the haptic module 154 may generate various tactile effects, including not only vibration, but also arrangement of pins vertically moving with respect to contacted skin, air injection force or air suction force through an injection hole or a suction hole, touch by a skin surface, contact with an electrode, effects by stimulus such as electrostatic force, reproduction of cold or hot feeling using a heat absorbing device or a heat emitting device, and the like.

The haptic module 154 may be implemented to transmit tactile effects through direct contact of the user or allow the user to feel muscular sense using a finger or an arm. Two or more haptic modules 154 may be provided according to the configuration of the mobile terminal 100a and/or 100b.

The memory 160 may store programs for processing and control of the controller 180. Alternatively, the memory 160 may temporarily store input/output data (e.g., phonebook data, messages, audio, still images, video, etc.). The memory 160 may store the frequency of use for the above data (e.g., the frequency of use for each phone number, each message, and each multimedia image).

The memory 160 may store data related to various patterns of vibration and audio which are output in response to touch input on the touchscreen.

The memory 160 may include at least one type of storage medium including a flash memory type, a hard disc type, a multimedia card micro type, a card type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disc, or an optical disc. The mobile terminal 100a and/or 100b may also be operated in relation to a network storage device that performs the storage function of the memory 160 over the Internet.

The interface unit 170 serves as an interface with all external devices connected to the mobile terminal 100a and/100b. The interface unit 170 may receive data transmitted from an external device, supply power to each element within the mobile terminal 100a and/or 100b, or transmit internal data of the mobile terminal 100a and/or 100b to the external devices. The interface unit 170 may include, for example, a wired or wireless headset port, an external charger port, a wired or wireless data port, a memory card port, a port for connecting a device having an identification module, an audio input/output (I/O) port, a video I/O port, an earphone port, and a pogo port.

The identification module may be a chip that stores various information for authenticating an authority to use the mobile terminal 100a and/or 100b and may include a user identity module (UIM), a subscriber identity module (SIM), a universal subscriber identity module (USIM), and the like. In addition, the device having the identification module (hereinafter, "identification device") may be implemented in a smart card format. Accordingly, the identification device may be connected to the terminal 100a and/or 100b via a port.

When the mobile terminal 100a and/or 100b is connected to an external cradle, the interface unit 170 may serve as a path to allow power from the cradle to be supplied to the mobile terminal 100a and/or 100b or as a path to allow various command signals input by the user from the cradle to be transferred to the mobile terminal. Various command signals or power input from the cradle may operate as signals for recognizing that the mobile terminal has accurately been mounted on the cradle.

The controller 180 typically controls the overall operation of the mobile terminal. For example, the controller 180 performs control and processing associated with a voice call, data communication, a video call, and the like. The controller 180 may include a multimedia module 181 which provides multimedia playback. The multimedia module 181 may be configured as part of the controller 180 or as a separate component.

The controller 180 may perform pattern recognition processing so as to recognize writing or drawing input on the touchscreen as text or images, respectively.

The power supply unit 190 receives internal power or external power under the control of the controller 180 and supplies power required by various components. The power supply 190 may include, for example, a battery, a connection port, a power supply controller, and a charging monitoring unit.

The battery may be a rechargeable embedded battery and may be configured to be detachable from the terminal body for recharging. The connection port may be configured as one example of the interface unit 170 to which an external charger for supplying power to recharge the battery is electrically connected.

Various embodiments described herein may be implemented in a computer-readable medium or similar medium using, for example, software, hardware, or any combination thereof.

Figure 2:
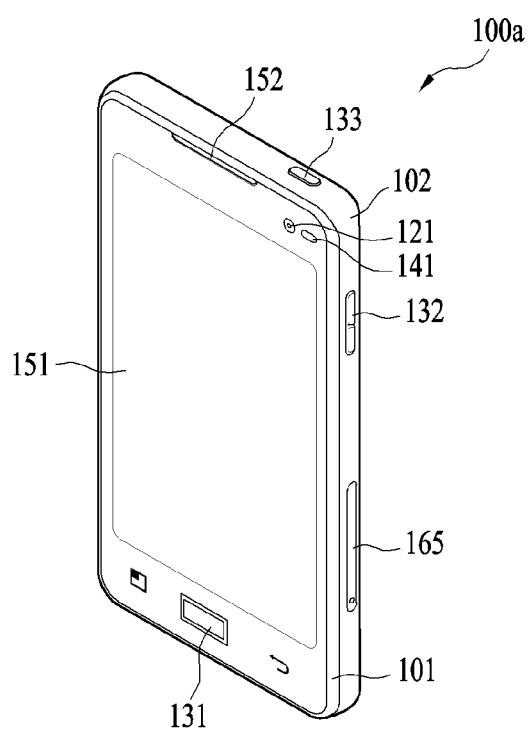
FIG. 2 is a front perspective view of a first mobile terminal according to an embodiment of the present disclosure.

FIG. 2 is a front perspective view of a mobile terminal 100a according to an embodiment of the present disclosure.

A pair of mobile terminals 100a and/or 100b may have the same size and shape or have different sizes or shapes. For example, the aspect ratio of the mobile terminal 100a may be 3:4 and the aspect ratio of the mobile terminal 100b may be 3:5.

A pair of mobile terminals may have the same performance. Alternatively, one mobile terminal 100a may have a specific function and another mobile terminal 100b may not have a specific function so that a corresponding function may be implemented through one mobile terminal. For example, when only one mobile terminal is capable of performing data communication, the mobile terminal may be tethered to expand a data communication function for the other mobile terminal.

However, each of the terminals includes a display unit and an audio output module performing an output function so as to serve as terminals and includes at least one of buttons or the touch sensor 137 for an input function. In addition, each of the both terminals includes the near field communication module 114, 115, and/or 116 (refer to FIG. 1) to exchange signals. Both terminals or only one of the terminals may include the mobile communication module.

In the present disclosure, plural display units are provided through separate terminals. Thus, the display unit may be attached to or detached from the terminal when necessary. Therefore, the terminal is advantageous in portability and may be implemented to be thinner than an existing integrated dual display.

The mobile terminal 100a includes cases 101 and 102 forming an outer appearance of a body. In this embodiment, the cases may be categorized into a front case 101 and a rear case 102. Various electronic components are installed in a space formed between the front case 101 and the rear case 102.

In some case, electronic components may also be installed on a surface of the rear case 102. The electronic components installed on the surface of the rear case 102 include a battery detachable by a user, a USIM card, and a memory card. A terminal portion for connection to the second mobile terminal 100*b* may further be installed on the surface of the rear case 102.

The cases 101 and 102 may be formed by injecting synthetic resin or be formed of a metal material such as stainless steel (STS) or titanium (Ti).

The display unit 151, the audio output module 152, the user input unit 130 (131 and 132), the microphone 122, and the interface unit 170 may be arranged on the cases 101 and 102. Here, the user input unit 131 may be omitted when necessary.

The display unit 151 occupies most of a main surface of the front case 101. The audio output module 152 and the camera 121 are disposed in an area adjacent to one end of both ends of the display unit 151, and the user input unit 131 and the microphone 122 are disposed in an area adjacent to the other end thereof. However, the user input 131 may be omitted if necessary. The user input unit 132 and the interface unit 170 may be arranged on side surfaces of the front case 101 and the rear case 102.

The user input unit 130 is manipulated to receive a command for controlling the operation of the mobile terminal 100*a* and may include a plurality of manipulation units 131, 132, and 133. The manipulation units 131, 132, and 133 may also be collectively referred to as manipulation units.

Content input by the first and second manipulation units 131 and 132 may be variously set. For example, the first manipulation unit 131 may receive commands such as start, end, and scroll, the second manipulation unit 132 may receive commands such as adjustment of the magnitude of sound output from the sound output module 152, and the third manipulation unit 133 may receive a command such as activation/deactivation of a touch recognition mode of the display unit 151.

The manipulation units 131, 132, and 133 may use a button scheme that recognizes input when a user applies pressure. Alternatively, the operation units 131, 132, and 133, in addition to the display unit 151, may be provided with the touch sensor 137, so that a command of the user may be received only by touch by the user. Alternatively, some of the manipulation units may be omitted and a command may be received only by touch by the user on the display unit 151.

Figure 3:
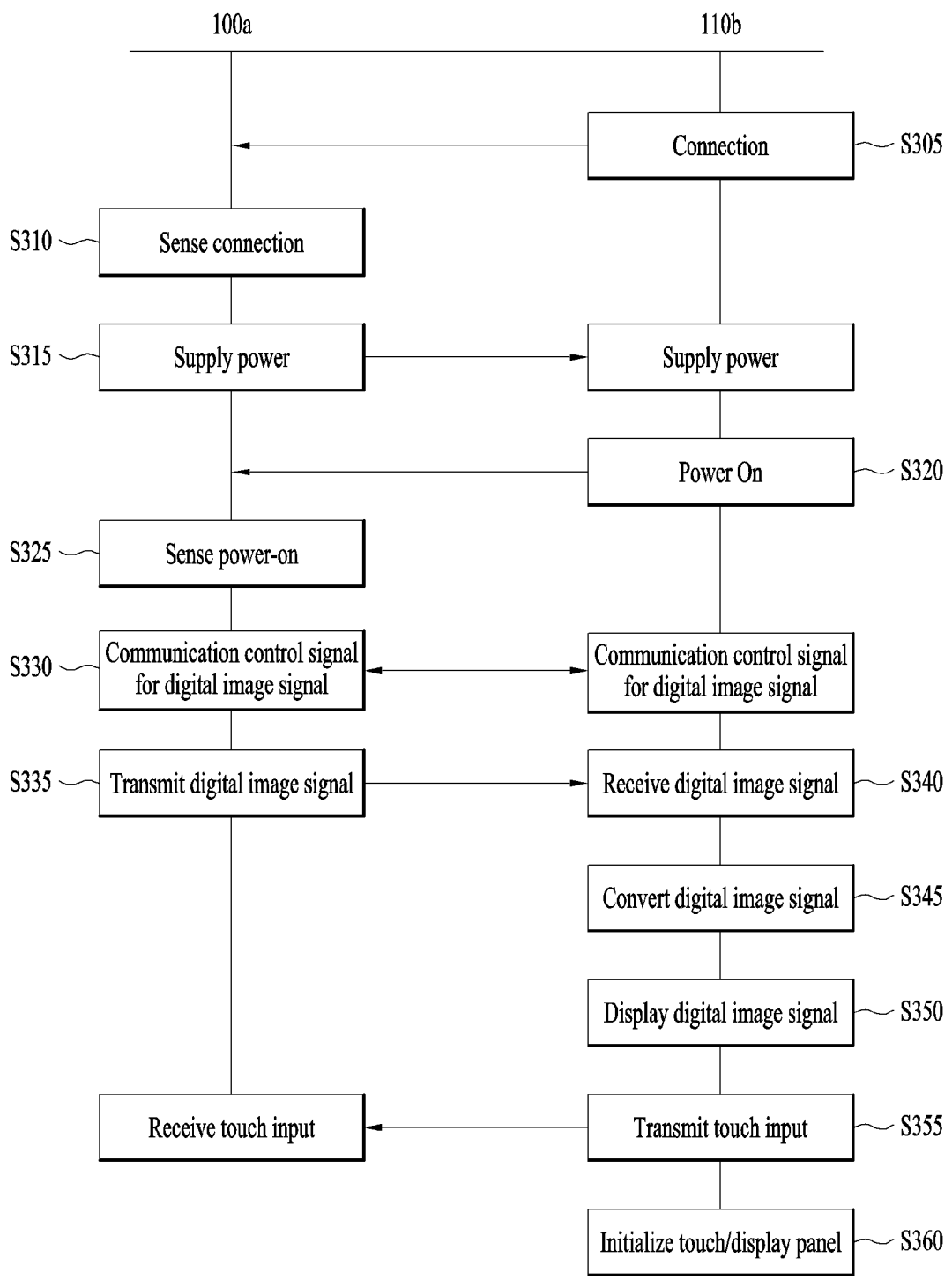
FIG. 3 is a flowchart sequentially illustrating the operation of a pair of mobile terminals according to an embodiment of the present disclosure.

FIG. 3 is a flowchart sequentially illustrating the operation of a pair of mobile terminals according to an embodiment of the present disclosure.

First, the second mobile terminal 100*b* is connected to the first mobile terminal 100*a* (S305). The first mobile terminal 100*a* senses whether the second mobile terminal 100*b* is connected thereto (S310). If the connection is sensed, the first mobile terminal 100*a* supplies power to the second mobile terminal 100*b* (S315). If the power is supplied, the power is supplied to each component of the second mobile terminal 100*b* so that the second mobile terminal 100*b* is powered on (S320). The first mobile terminal 100*a* senses that the second mobile terminal 100*b* has been powered on (S325). The first mobile terminal 100*a* and the second mobile terminal 100*b* transmit and receive a communication control signal for a digital image signal (S330) to and from each other. The first mobile terminal 100*a* transmits the digital image signal (S335). The second mobile terminal 100*b* receives the digital image signal (S340). The second mobile terminal 100*b* converts the received digital image signal into a signal suitable for display (S345). The second mobile terminal 100*b* displays the converted digital image signal (S350). The second mobile terminal 100*b* transmits touch input from the user to the first mobile terminal 100*a* (S355). The second mobile terminal initializes a touch/display panel (S360). For each step, reference is made to FIGS. 4 and 5.

Figure 4:
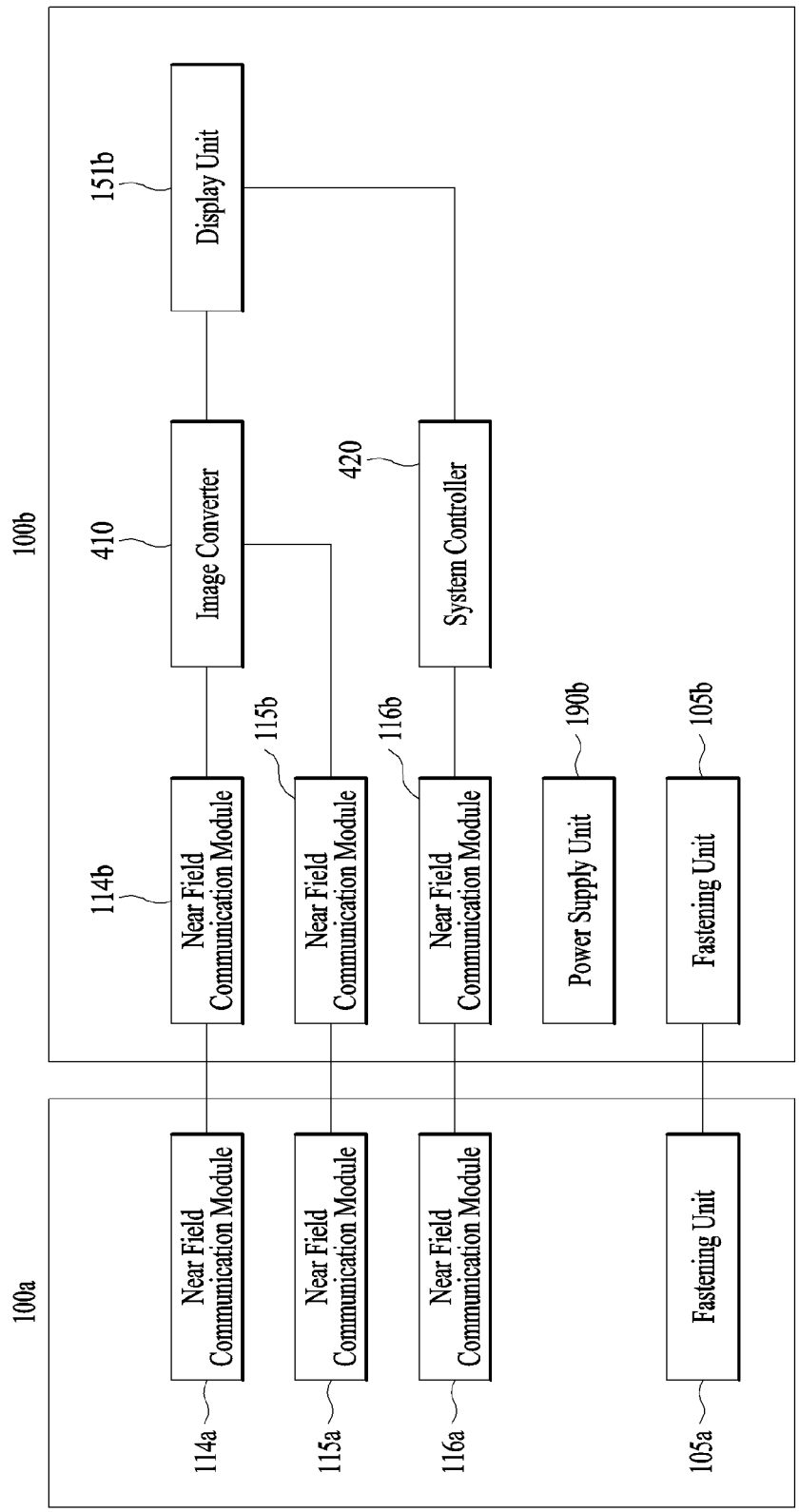
FIG. 4 is a diagram illustrating a control circuit system for a pair of mobile terminals according to an embodiment of the present disclosure.

FIG. 4 is a diagram illustrating elements of a pair of mobile terminals according to an embodiment of the present disclosure.

The first mobile terminal 100*a* determines whether the first mobile terminal 100*a* is connected to or separated from the second mobile terminal 100*b* using magnetic force of a magnet of the second mobile terminal 100*b*. For example, if the first mobile terminal 100*a* recognizes magnetic force caused by the magnet of the second mobile terminal 100*b* through a proximity sensor implemented as a Hall IC, it is determined that the first mobile terminal 100*a* is connected to the second mobile terminal 100*b*.

If it is determined that the first mobile terminal 100*a* is connected to the second mobile terminal 100*b*, the first mobile terminal 100*a* may supply power to the second mobile terminal 100*b* through a first fastening unit 105*a*, thereby controlling supply of power to components included in the second mobile terminal 100*b*. Accordingly, the second mobile terminal 100*b* may commonly use a battery of the first mobile terminal 100*a* even though the second mobile terminal 100*b* has no separate battery.

If power is supplied to the second mobile terminal 100*b* and a system is initialized and booted as an operable state, the second mobile terminal 100*b* transmits information indicating that a current state is operable to the first mobile terminal 100*a*. The information indicating that the current state is operable may be wirelessly transmitted and received using a frequency band of 60 GHz through communication between a fifth near field communication module 115*b* of the second mobile terminal 100*b* and a second near field communication module 115*a* of the first mobile terminal 100*a*.

Upon recognizing that the second mobile terminal 100*b* is in an operable state, the controller 180 of the first mobile terminal 100*a* transmits a digital image signal to be output through a display unit 151*b* of the second mobile terminal 100*b* to the second mobile terminal 100*b*. The digital image signal may be wirelessly transmitted and received using a frequency band of 60 GHz through communication of a first near field communication module 114*a* of the first mobile terminal 100*a* and a fourth near field communication module 114*b* of the second mobile terminal 100*b*. When the digital image signal is transmitted and received through physical contact using, for example, a pogo pin, degradation in picture quality of the digital image signal may occur due to occurrence of impedance of a contact terminal. However, in the present disclosure, picture quality of the digital image signal may be maintained by wirelessly transmitting and receiving the digital image signal.

A communication control signal needed when the first mobile terminal 100*a* transmits the digital image signal to the second mobile terminal 100*b* may be wirelessly transmitted and received using a frequency band of 60 GHz through communication between the second near field communication module 115*a* of the first mobile terminal and the fifth near field communication 115*b* of the second mobile terminal 100*b*.

Upon receiving the digital image signal from the first mobile terminal 100*a*, the second mobile terminal 100*b* transmits this signal to an image converter 410 of the second mobile terminal 100*b*. For example, if the digital image signal received from the first mobile terminal is in DisplayPort (DP) format, the image converter 410 of the second mobile terminal 100*b* converts the digital image signal into a mobile industry processor interface (MIPI) format, which is a data format that an LCD panel may receive, and transmits the MIPI format to the LCD panel. The LCD panel may display the converted digital image signal.

Upon receiving user input from the touch sensor 137, the second mobile terminal 100b may wirelessly transmit and receive information about the user input using a frequency band of 60 GHz through communication between a third near field communication module 116a of the first mobile terminal 100a and a sixth near field communication module 116b of the second mobile terminal 100b. For example, the user input may serve to control the brightness of the display unit 151b of the second mobile terminal 100b or control an image signal.

The touch sensor 137 and the output unit 150 of the second mobile terminal 100b may be initialized by a system controller 420 of the second mobile terminal 100b.

Figure 5:
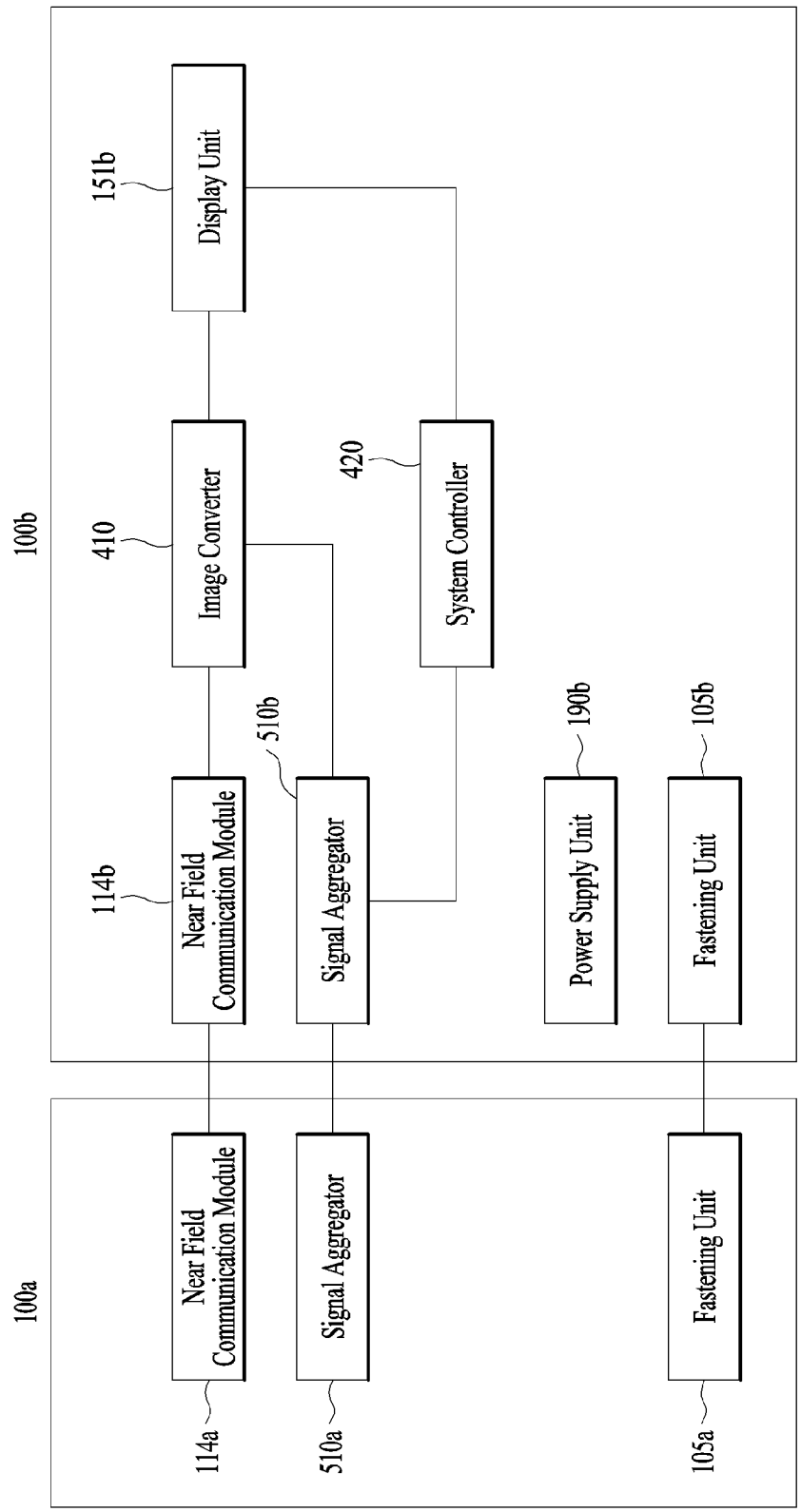
FIG. 5 is a diagram illustrating a control circuit system for a pair of mobile terminals according to another embodiment of the present disclosure.

FIG. 5 is a diagram illustrating elements of a pair of mobile terminals according to another embodiment of the present disclosure. Unlike the embodiment of FIG. 4, the embodiment of FIG. 5 is configured such that second and third near field communication modules 115a and 116a of the first mobile terminal 100a are replaced with a first signal aggregator 510a of the first mobile terminal 100a, and the fifth and sixth near field communication modules of the second mobile terminal 100b are replaced with a second signal aggregator 510b. Power consumption may be reduced and a module may be minimized by replacing a plurality of near field communication modules with one signal aggregator.

Signal transfer between the first mobile terminal 100a and the second mobile terminal 100b is performed in the following order.

The first mobile terminal 100a determines whether the first mobile terminal 100a is connected to or separated from the second mobile terminal 100b using magnetic force of a magnet of the second mobile terminal 100b. For example, if the first mobile terminal 100a recognizes magnetic force caused by the magnet of the second mobile terminal 100b through a proximity sensor implemented as a Hall IC, it is determined that the first mobile terminal 100a is connected to the second mobile terminal 100b.

If it is determined that the first mobile terminal 100a is connected to the second mobile terminal 100b, the first mobile terminal 100a may supply power to the second mobile terminal 100b through the first fastening unit 105a, thereby controlling supply of power to components included in the second mobile terminal 100b.

If power is supplied to the second mobile terminal 100b and a system is initialized and booted as an operable state, the second mobile terminal 100b transmits information indicating that a current state is operable to the first mobile terminal 100a. The information indicating that the current state is operable may be transmitted and received through communication between the first signal aggregator 510a of the first mobile terminal 100a and the second signal aggregator 510b of the second mobile terminal 100b.

Upon recognizing that the second mobile terminal 100b is in an operable state, the controller 180 of the first mobile terminal 100a transmits a digital image signal to be output through the display unit 151b of the second mobile terminal 100b to the second mobile terminal 100b. The digital image signal may be wirelessly transmitted and received using a frequency band of 60 GHz through communication of the first near field communication module 114a of the first mobile terminal 100a and the fourth near field communication module 114b of the second mobile terminal 100b.

Upon receiving the digital image signal from the first mobile terminal 100a, the second mobile terminal 100b transmits this signal to the image converter 410 of the second mobile terminal 100b. For example, if the digital image signal received from the first mobile terminal is in DP format, the image converter 410 of the second mobile terminal 100b converts the digital image signal into an MIPI format, which is a data format that the LCD panel may receive, and transmits the MIPI format to the LCD panel. The LCD panel may display the converted digital image signal.

Signals needed to be transmitted between the first mobile terminal 100a and the second mobile terminal 100b are transmitted to the first and second signal aggregators 510a and 510b through a multi-input channel. The first and second signal aggregators 510a and 510b transmit and receive the transmitted signals using a pogo pin.

The touch sensor 137 and the output unit 150 of the second mobile terminal 100b may be initialized by the system controller 420 of the second mobile terminal 100b.

Figure 6:
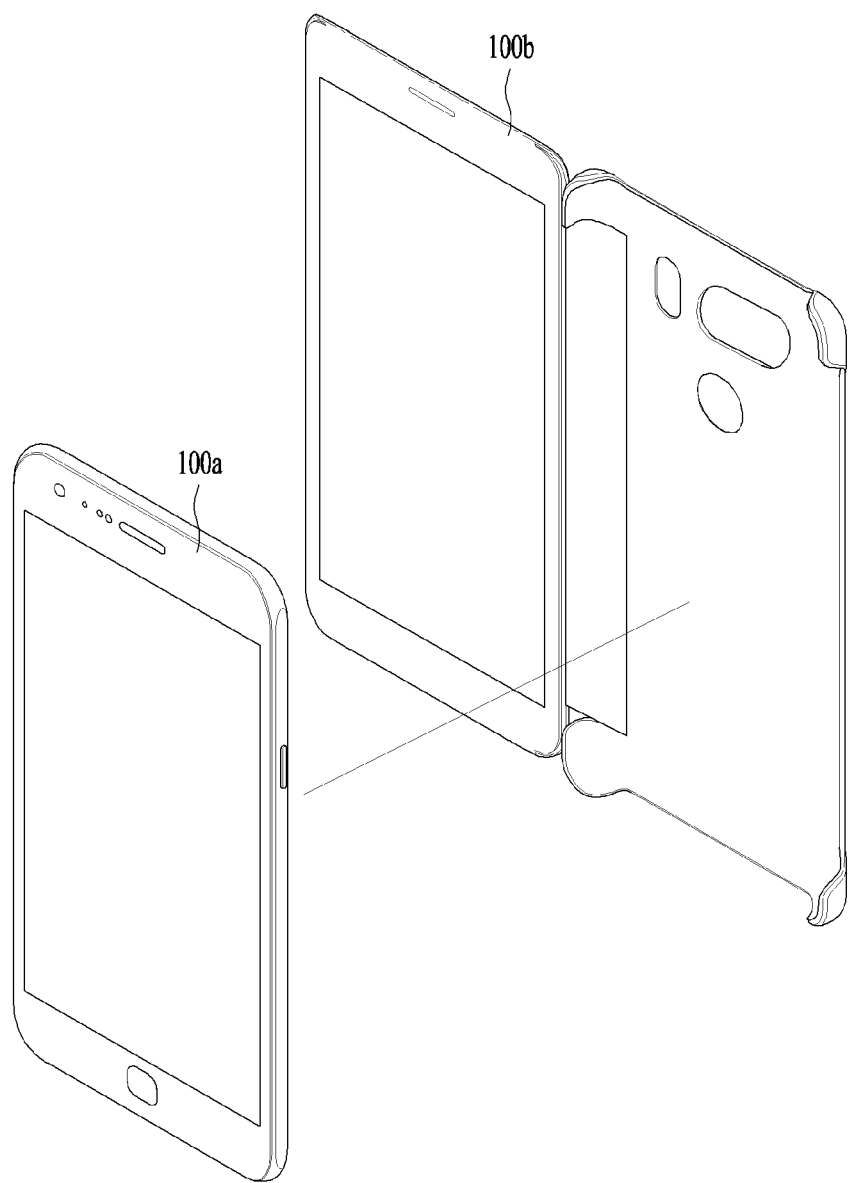
FIG. 6 is a diagram illustrating an outer appearance of a pair of mobile terminals, before the mobile terminals are combined, according to an embodiment of the present disclosure.

FIG. 6 is a diagram illustrating an outer appearance of a pair of mobile terminals, before the mobile terminals are combined, according to an embodiment of the present disclosure.

The first mobile terminal 100a may be combined with the second mobile terminal 100b having the structure of a case. While, in FIG. 6, the display unit of the second mobile terminal 100b is arranged on the left side of the first mobile terminal 100a, the display unit of the second mobile terminal 100b is not limited to such arrangement and may be arranged in an upper, lower, left, or right side of the first terminal 100a.

Figure 7:
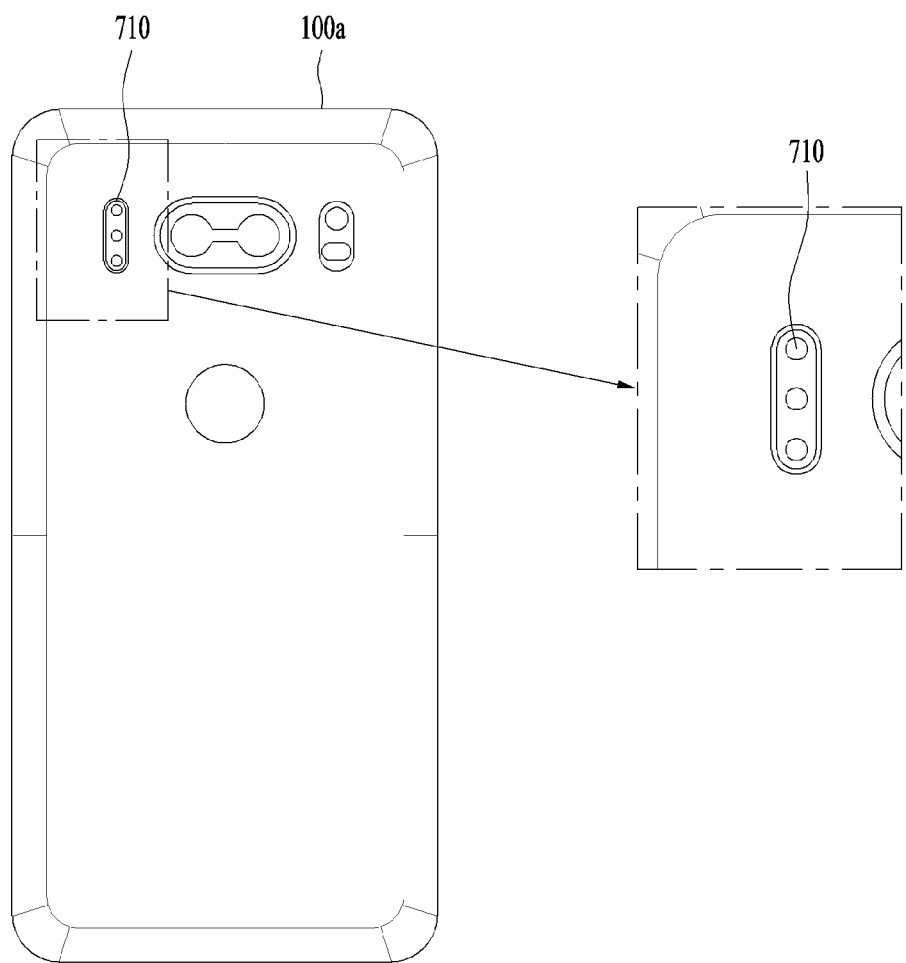
FIG. 7 is a diagram illustrating a rear surface of the first mobile terminal according to an embodiment of the present disclosure.

FIG. 7 is a diagram illustrating a rear surface of the first mobile terminal according to an embodiment of the present disclosure.

A first fastening unit 710 for connecting the first mobile terminal 100a and the second mobile terminal 100b is arranged on the rear surface of the first mobile terminal 100a. Power may be supplied and data may be transmitted and received, through the first fastening unit 710. For example, the first fastening unit 710 of the first mobile terminal 100a may be connected to the second mobile terminal 100b using a pogo pin. In FIG. 7, the first fastening unit 710 is illustrated as having three terminal portions. However, the number of terminal portions may be changed when necessary. While, in FIG. 7, the first fastening unit 710 is located at a left upper side of the rear surface of the first mobile terminal, the first fastening unit 710 is not limited to such arrangement and the location of the terminal portions of the first fastening unit 710 may be changed when necessary.

Figure 8:
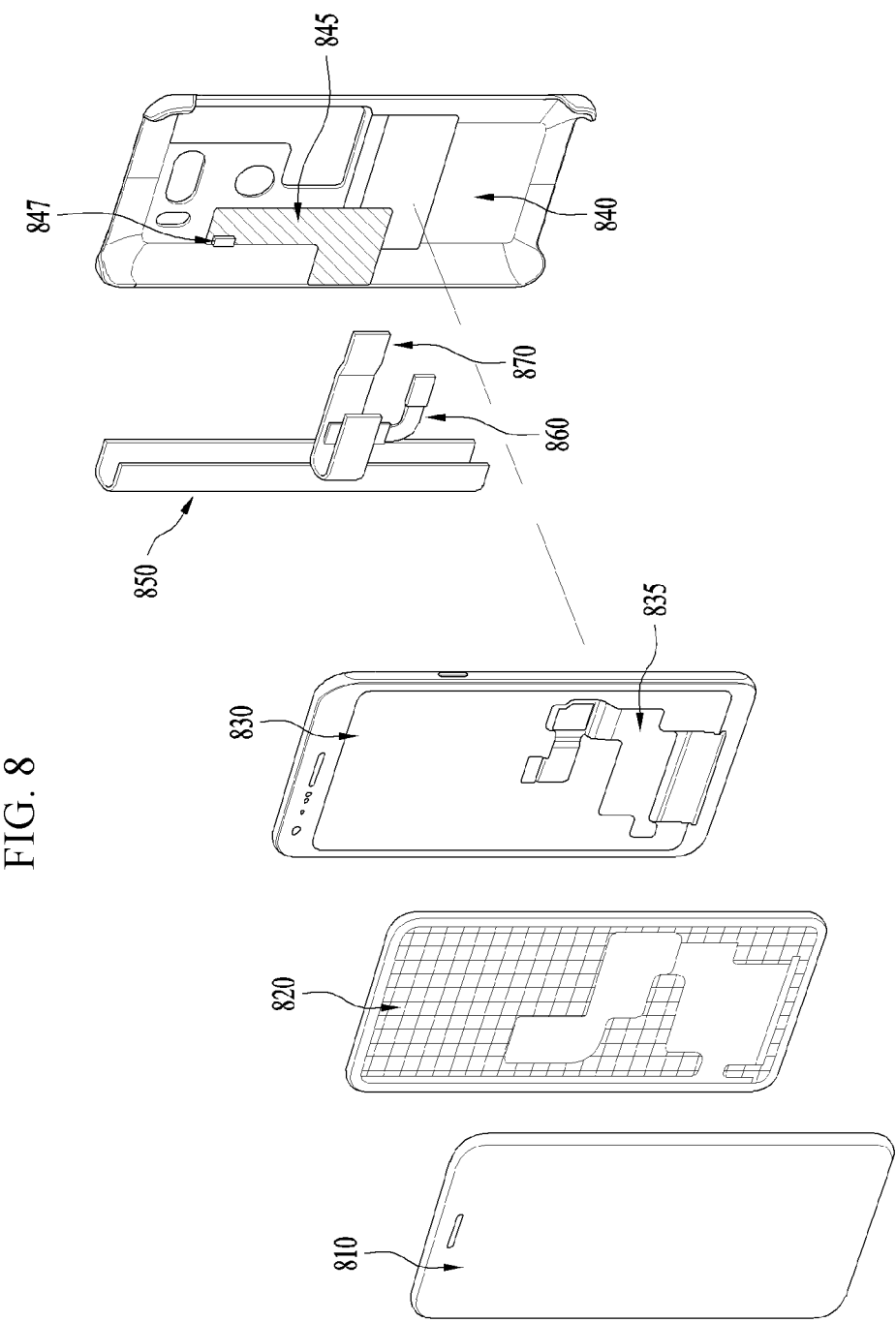
FIG. 8 is an exploded view of a second mobile terminal according to an embodiment of the present disclosure.

FIG. 8 is an exploded view of the second mobile terminal according to an embodiment of the present disclosure.

The second mobile terminal according to an embodiment of the present disclosure includes a first case 810, a substrate 820, a liquid crystal display 830, a second case 840, a supporter 850, a first connecter 860, and a second connecter 870. The first case 810 may also be referred to as a first cover portion, and the second case 840 may be referred to as a second cover portion.

The substrate 820 is disposed on the first case 810, and the liquid crystal display 830 including a circuit 835 is disposed on the substrate 820. The first case 810 and the second case 840 are connected by the first connecter 860 and the second connector 870 attached to the support 850.

The first connector 860 attached to the supporter 850 is connected to a circuit 835 of the liquid crystal display 830, and the second connector 870 attached to the supporter 850 is connected to a circuit 845 of the second case 840. Each of the components described in FIG. 1 may be disposed on the circuit 835 of the liquid crystal display 830 and the circuit 845 of the second case 840. The circuit 845 may also be referred to as a circuit board unit or a control circuit.

The supporter 850, the first connector 860, and the second connector 870 are formed of a flexible material, so that the first case 810 and the second case 840 connected to the supporter 850 may be unfolded or folded. For example, the supporter 850 may be formed of leather, and the first connector 860 and the second connector 870 may be formed of a flexible printed circuit board (FPCB). Therefore, when the first case 810 and the second case 840 are folded oppositely, image signals may be displayed on both sides, i.e., on a front side through the display unit of the first mobile terminal and on a rear side through the display unit of the second mobile terminal.

A second fastening unit 847 is arranged on the circuit 845 of the second case 840 to couple the first mobile terminal 100a and the second case 840. For example, the second fastening unit 847 may be implemented as a pogo pin.

Figure 9A:
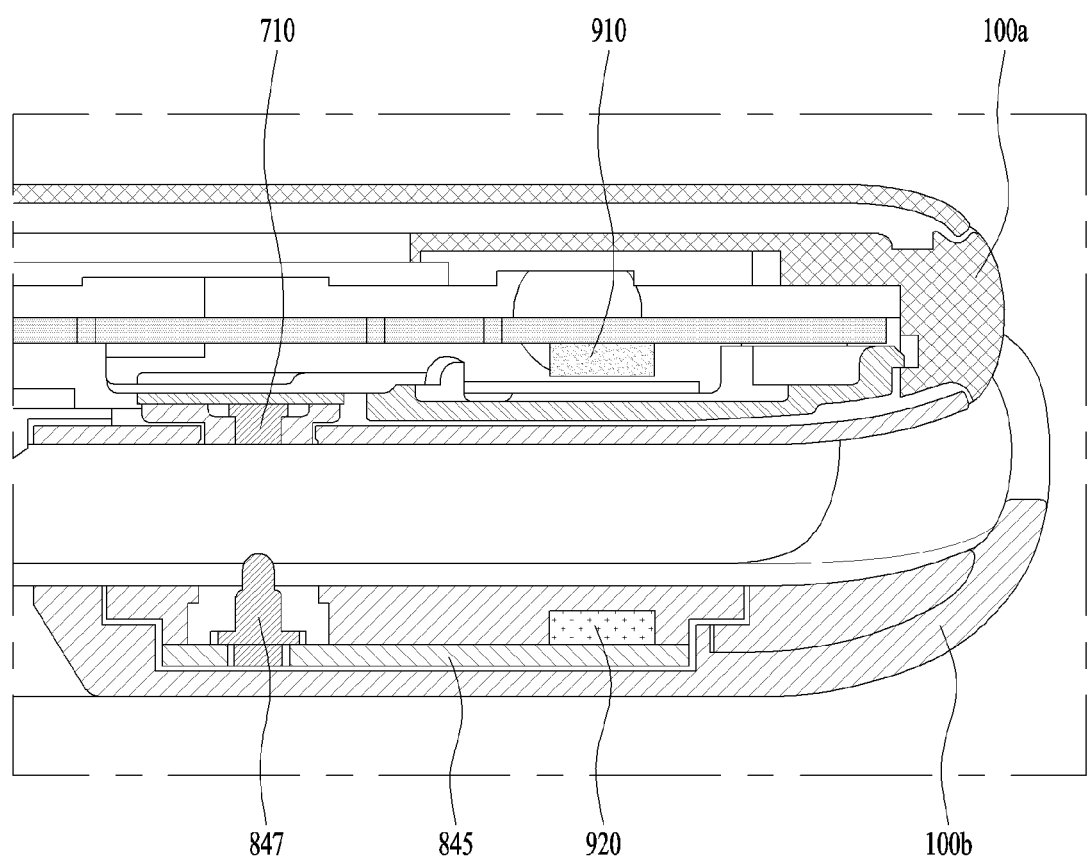
FIGS. 9A and 9B are side cross-sectional views, before and after a pair of mobile terminals are combined, according to an embodiment of the present invention.
Figure 9B:
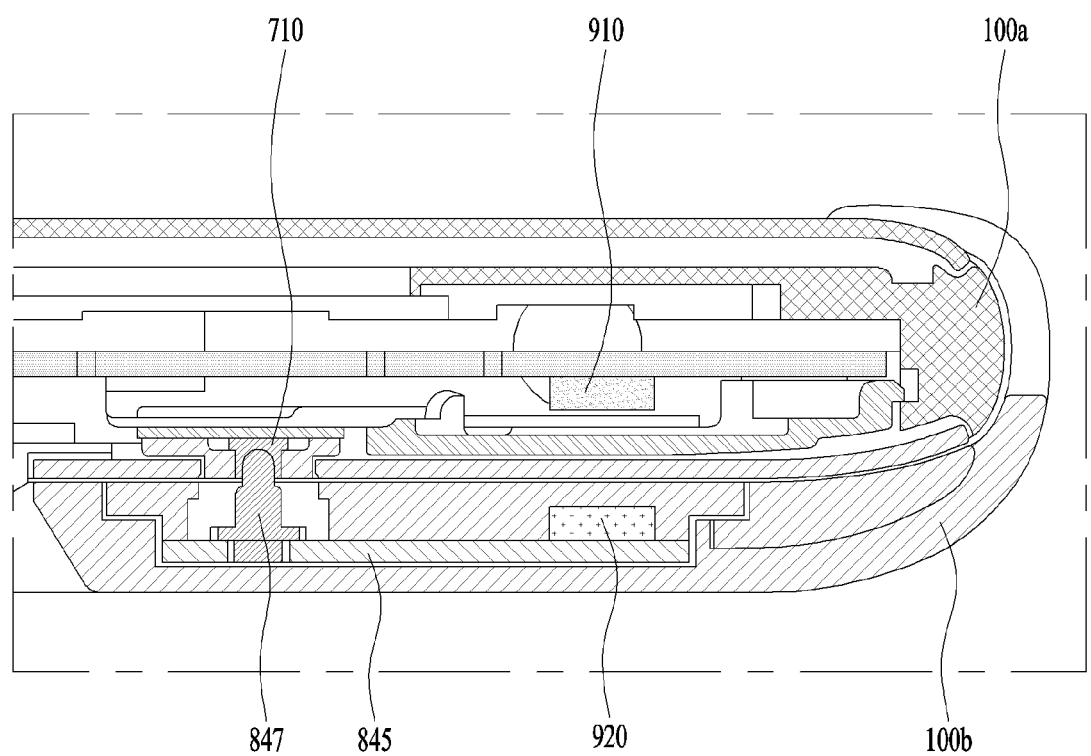

FIGS. 9A and 9B are side cross-sectional views, before and after a pair of mobile terminals are combined, according to an embodiment of the present invention.

Referring to 9A, the first fastening unit 710 is arranged on a rear surface of the first mobile terminal 100a, and the second fastening unit 847 is disposed on the circuit 845 of the second case 840 of the second mobile terminal 100b to which the first mobile terminal 100a is coupled. Therefore, when it is desired to couple the first mobile terminal 100a to the second mobile terminal 100b, the fastening unit 710 of the first mobile terminal and the fastening unit 847 of the second mobile terminal 100b are coupled.

Referring to FIG. 9B, a pair of mobile terminals is coupled, and a near field communication module 910 of the first mobile terminal 100a and a near field communication module 920 of the second mobile terminal 100b may transmit and receive data to and from each other. For example, each of the near field communication modules 910 and 920 may include a plurality of near field communication modules. Alternatively, signal aggregators may be mounted on the circuit 845 of the second case 840.

Figure 10A:
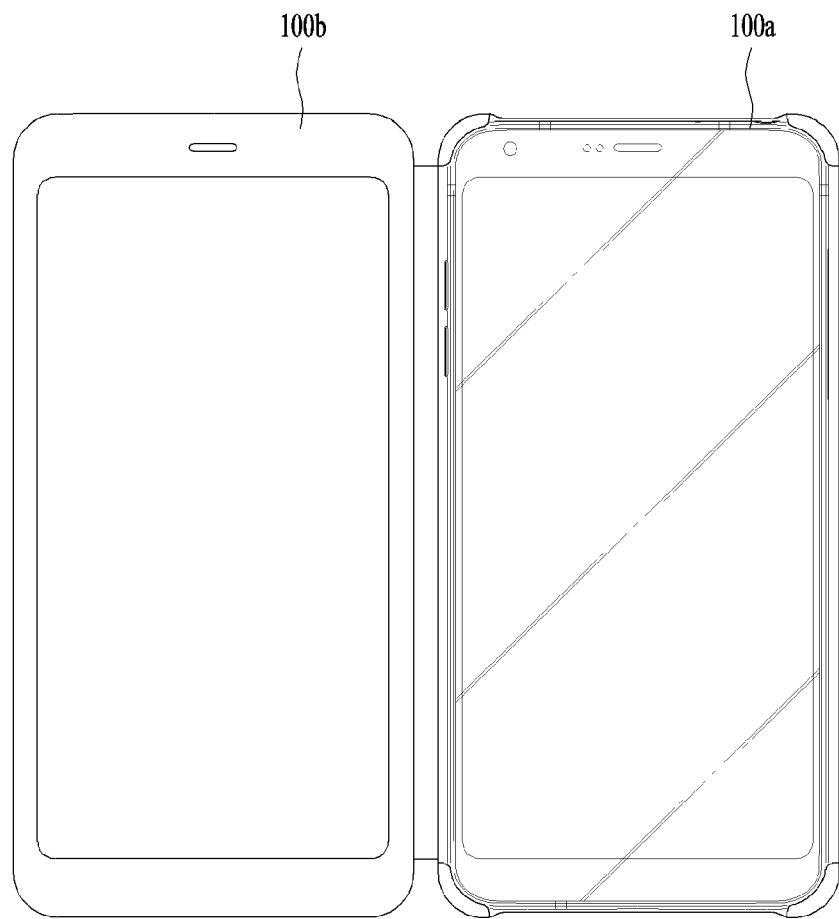
FIGS. 10A and 10B are views showing combined and separated outer appearances of a pair of mobile terminals according to an embodiment of the present disclosure.
Figure 10B:
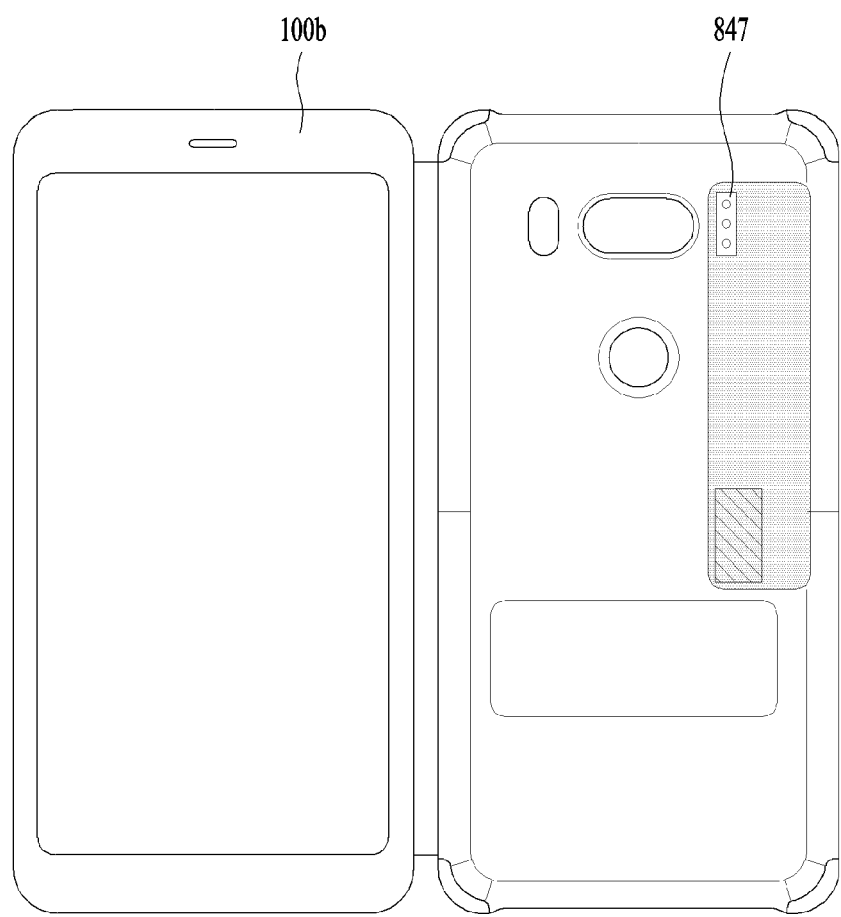

FIGS. 10A and 10B are views showing combined and separated outer appearances of a pair of mobile terminals according to an embodiment of the present disclosure.

FIG. 10A shows an unfolded outer appearance of the first mobile terminal 100a and the second mobile terminal 100b. The first mobile terminal 100a is coupled to the second case 840 of the second mobile terminal 100b. After the first mobile terminal 100a is combined, the second case 840 of the second mobile terminal 100b may serve to protect the first mobile terminal 100a.

FIG. 10B is a view showing an unfolded outer appearance of the display unit of the second mobile terminal 100b and the second case 840 after the first mobile terminal 100a is separated from the second mobile terminal 100b.

Figure 11A:
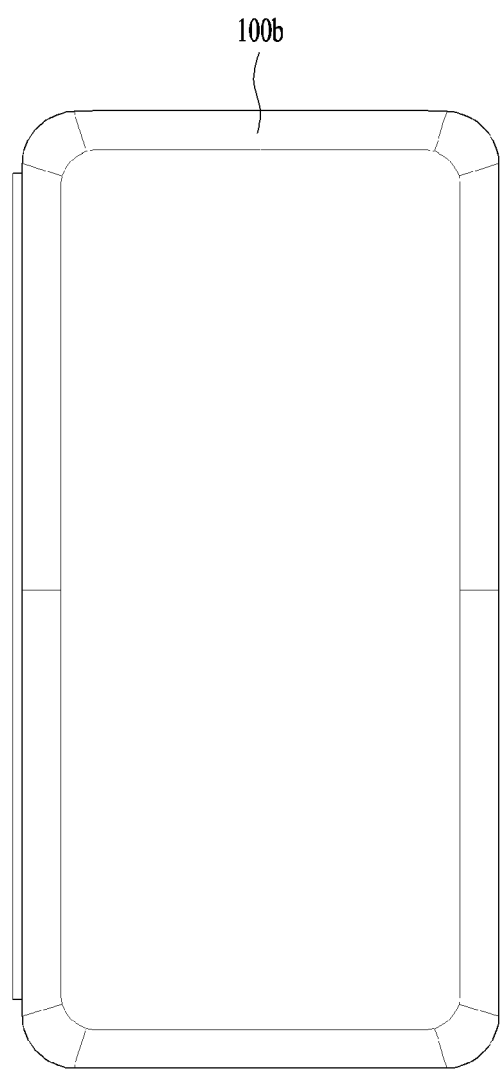
FIGS. 11A, 11B, 11C, 11D, 11E, and 11F show outer appearances of a pair of mobile terminals, after the mobile terminals are combined, according to an embodiment of the present invention.
Figure 11B:
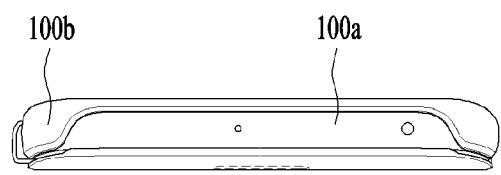
Figure 11C:
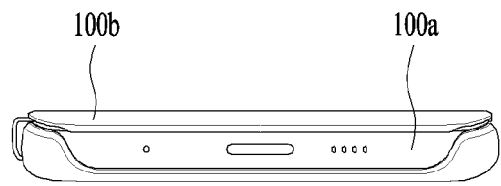
Figure 11D:
Figure 11E:
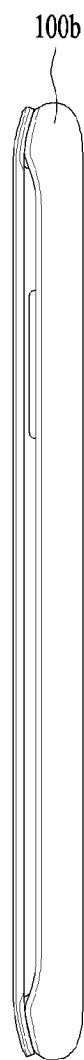
Figure 11F:
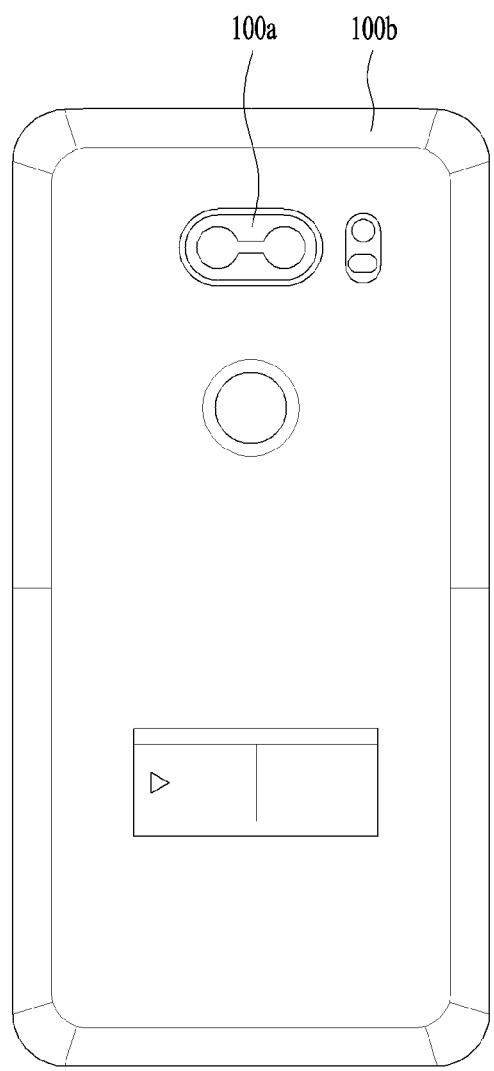

FIGS. 11A, 11B, 11C, 11D, 11E, and 11F show outer appearances of a folded state of the first mobile terminal 100a and the second mobile terminal 100b, after the pair of mobile terminals is combined, according to an embodiment of the present invention. Specifically, FIG. 11A shows a front surface of the combined mobile terminals, FIG. 11B shows a top surface of the combined mobile terminals, FIG. 11C shows a bottom surface of the combined mobile terminals, FIG. 11D shows a left surface of the combined mobile terminals, FIG. 11E shows a right surface of the combined mobile terminals, and FIG. 11F shows a rear surface of the combined mobile terminals. When the first mobile terminal 100a and the second mobile terminal 100b are folded after being combined, the first mobile terminal 100a may be protected from external impact etc. by the first case 810, the second case 840, and the supporter 850 of the second mobile terminal 100b.

Those skilled in the art will appreciate that the present disclosure may be carried out in other specific ways than those set forth herein without departing from the spirit and essential characteristics of the present disclosure.

The above detailed description should not be construed as limitative in all terms, but should be considered as illustrative. The scope of the present disclosure should be determined by reasonable analysis of the accompanying claims, and all changes in the equivalent range of the present disclosure are included in the scope of the present invention.

INDUSTRIAL APPLICABILITY

The combinable and separable mobile terminals are industrially applicable to various devices including a smartphone, a handheld terminal, or a device including a display unit.

The invention claimed is:

1. A control circuit system for a pair of mobile terminals including a mobile terminal and a protective case,
wherein the mobile terminal includes:
a first display device;
a first fastening device;
a proximity sensor configured to sense whether or not the mobile terminal is connected with the protective case; and
a first control circuit including a first near field communication device and a first signal aggregator, configured to transmit and receive a signal to and from the protective case, and
wherein the protective case includes:
a second display device;
a second fastening device connected to the first fastening device; and
a second control circuit including a second near field communication device and a second signal aggregator, configured to transmit and receive a signal to and from the mobile terminal, and
wherein a signal transmitted by the first near field communication device is received by the second near field communication device and is then displayed on the second display unit, and
wherein, based on the proximity sensor sensing that the mobile terminal is connected with the protective case, the mobile terminal supplies power to the protective case and the mobile terminal determines whether the protective case is powered on or not.

2. The control circuit system of claim 1,
wherein the protective case further includes a magnet, and
wherein the proximity sensor senses whether the connection is made using magnetic force of the magnet.

3. The control circuit system of claim 1, wherein the first and second near field communication devices wirelessly transmit and receive a signal in a band of 60 GHz.

4. The control circuit system of claim 1, wherein the first and second near field communication devices transmit and receive an image signal.

5. The control circuit system of claim 1, wherein the first and second signal aggregators transmit and receive a communication control signal, and a touch information signal and a brightness control signal of the second display unit.

6. The control circuit system of claim 1,
wherein the second fastening device receives power from the first fastening unit, and
wherein the first and second signal aggregators transmit and receive a signal through the first and second fastening units.

7. The control circuit system of claim 1, wherein the first and second display units display different images.

8. The control circuit system of claim 1, wherein the first and second fastening units are configured as pogo pins.

* * * * *